S. L. NOBLE.
INTERNAL COMBUSTION ROTARY ENGINE.
APPLICATION FILED MAY 29, 1919.

1,329,625.

Patented Feb. 3, 1920.

INVENTOR.
STUART L. NOBLE
BY
Shigley & Harney
ATTORNEYS

S. L. NOBLE.
INTERNAL COMBUSTION ROTARY ENGINE.
APPLICATION FILED MAY 29, 1919.

1,329,625.

Patented Feb. 3, 1920.
4 SHEETS—SHEET 3.

INVENTOR.
STUART L. NOBLE
BY
Shigley & Harney
ATTORNEYS

S. L. NOBLE.
INTERNAL COMBUSTION ROTARY ENGINE.
APPLICATION FILED MAY 29, 1919.

Patented Feb. 3, 1920.

INVENTOR.
STUART L. NOBLE
BY
Shigley & Harney
ATTORNEYS

UNITED STATES PATENT OFFICE.

STUART L. NOBLE, OF COLUMBUS, OHIO.

INTERNAL-COMBUSTION ROTARY ENGINE.

1,329,625.  Specification of Letters Patent.  Patented Feb. 3, 1920.

Application filed May 29, 1919. Serial No. 300,578.

*To all whom it may concern:*

Be it known that I, STUART L. NOBLE, a citizen of the United States of America, residing at Columbus, in the county of Franklin and State of Ohio, have invented certain new and useful Improvements in Internal-Combustion Rotary Engines, of which the following is a specification.

The present invention relates generally to internal combustion engines, and more particularly to those of a rotary nature in which opposed pistons travel with alternately fast and slow movements in the same direction around and within an annular piston cylinder having intake and exhaust ports as well as charge firing means.

The primary object of my invention is to permit of the carrying out of the desired operation, with minimum friction and loss of power and with increased speed of movement of the driven shaft, as compared to those engines of this type heretofore proposed.

Other and further objects relating more or less to details of construction and operation, as well as the resulting advantages of the invention, will be clearly understood from the following description referring to the accompanying drawings, which form a part of this specification, and in which—

Figures 1, 2:
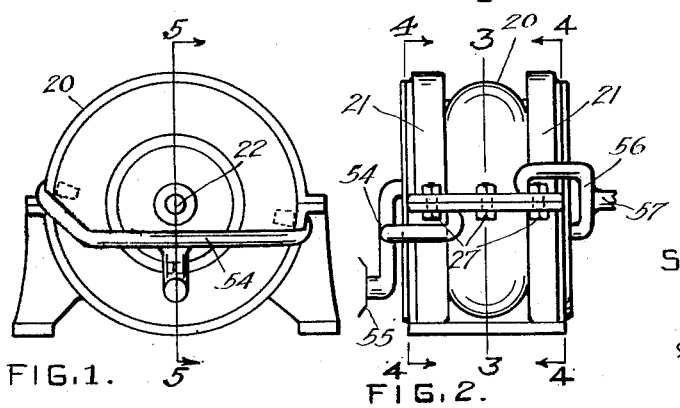
Figure 1 is a side elevation of my improved engine.
Fig. 2 is an end view thereof.

Referring now to these figures, and particularly to Figs. 1 and 2, the casing 20 of my improved engine is laterally extended to form gear housing 21, in the latter of which are housed the gears utilized to transmit movement from the pistons traveling in the central portion of the casing to the driven shaft 22. As seen particularly in Fig. 5, the casing 20 has an outer wall 23 and an inner wall 24, the latter of which is spaced around central hubs 25, to which it is connected by arms 26.

Figure 5:
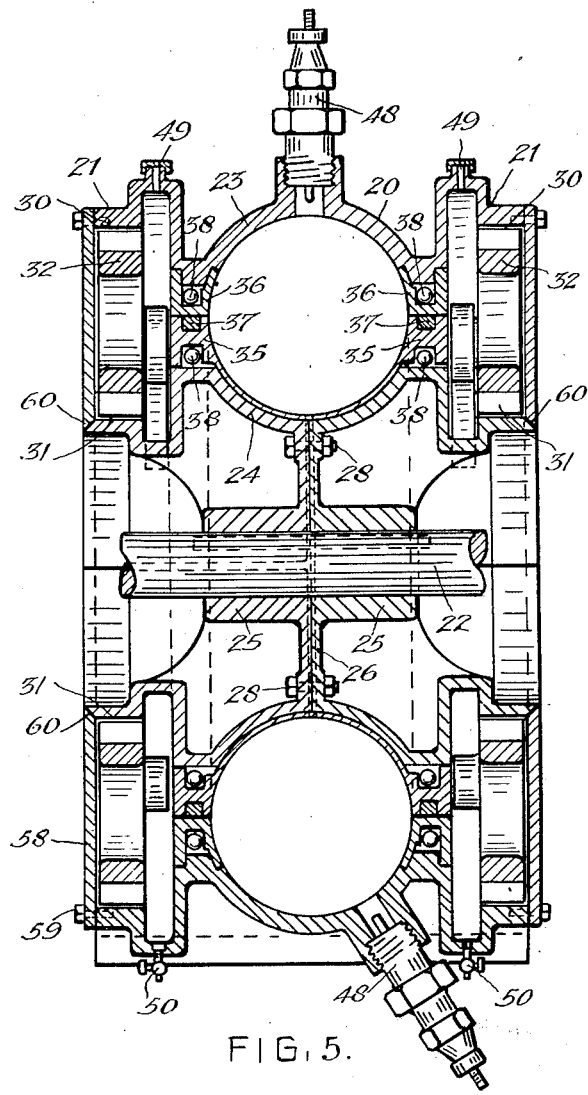
Fig. 5 is a vertical transverse section taken substantially on line 5—5 of Fig. 1.
Figure 6:
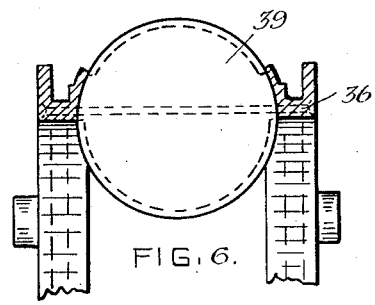
Figs. 6 and 7 are, respectively, a cross section and a top plan of a portion of the outer piston-carrying rings.
Figure 7:
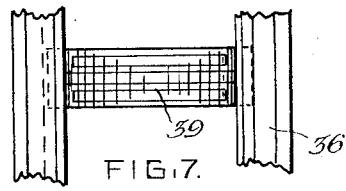
Figure 8:
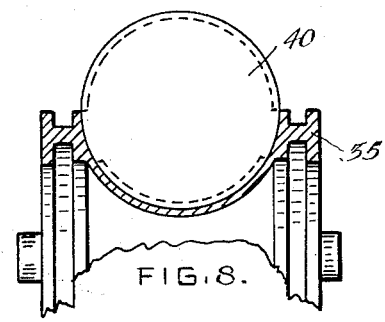
Figs. 8 and 9, are respectively, a cross section and a top plan of a portion of the inner piston-carrying rings.
Figure 9:
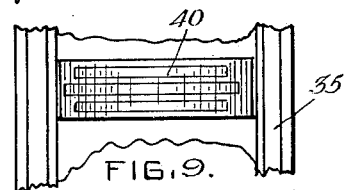

As seen in Fig. 2, the outer wall or shell 23 is divided horizontally into upper and lower sections, in order to facilitate assembly and disassembly, the parts being connected by bolts 27, and, as seen in Fig. 5, the inner wall or shell 24 is divided along its median line into side sections for a similar purpose, which side sections are connected by bolts 28.

Figure 4:
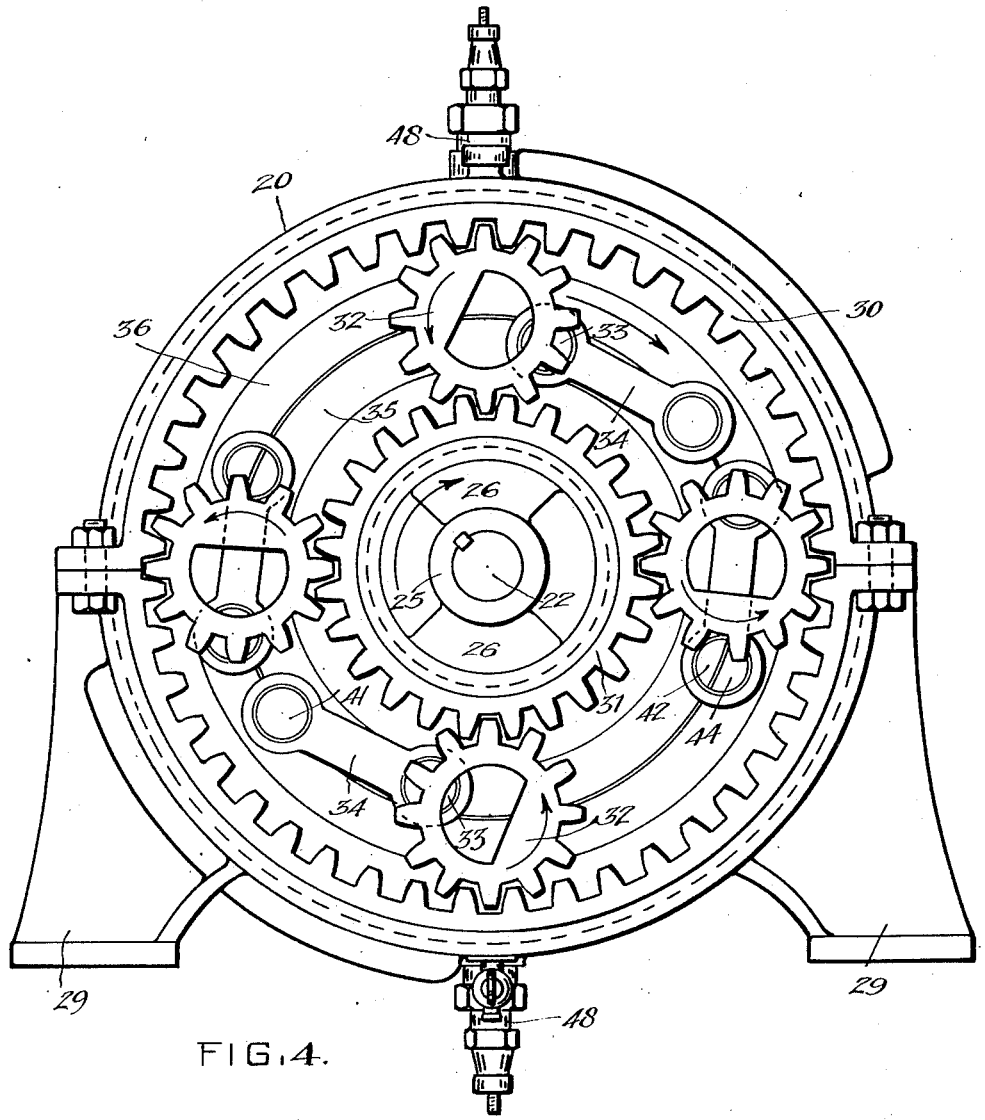
Fig. 4 is a vertical longitudinal section taken on either of the lines 4—4 of Fig. 2.

The central portion of the casing around the shaft 22 is thus opened to the extent of the length of the arms 26, which latter may, as seen in Fig. 4, be in the form of fan blades so as to drive a cooling current of air through the central portion of the casing in a volume parallel to the shaft 22.

At the gear casing 21, as previously described, the outer wall or shell 23, which in practice is substantially supported by virtue of its depending spaced footing 29, as in Fig. 4, has internal gear rings at 30, one of which is plainly seen in Fig. 4, and opposed to which in spaced relation are external gears 31, formed around the extended side portions of the inner wall or shell 24, and one of which is likewise to be plainly seen in Fig. 4.

Disposed at spaced points around and within the gear casings and in engagement with the internal and external gear rings are series of small freely rotatable gear wheels 32 which have inwardly projecting crank pins 33, to which series of crank arms 34 are connected at one end.

Centrally between the gear casings 21, the outer and inner walls or shells 23 and 24 are shaped to coöperate in the formation of an annular piston cylinder having spaces at the opposite sides thereof between bearing portions of the inner and outer walls or shells, which spaces are occupied by inner and outer piston-carrying rings 35 and 36, respectively, whose adjacent faces are in movable contact facilitated, as for instance, by annular leak-proof rings 37 carried by the inner piston-carrying rings 35. The surfaces of these inner and outer piston-carrying rings 35 and 36, respectively adjacent to the inner or outer shells of the casings, movably engage the latter preferably in a leak-proof fashion, their relative movement as regards the said inner and outer walls being preferably facilitated by antifriction balls or rollers 38.

Between the outer piston-carrying rings 36 and at spaced points therearound are carried a series of pistons 39 movably interfitting the piston cylinders, each of the pistons 39 and 40 being for this purpose of substantially the cross sectional area of the piston cylinder formed as above described.

Figure 11:
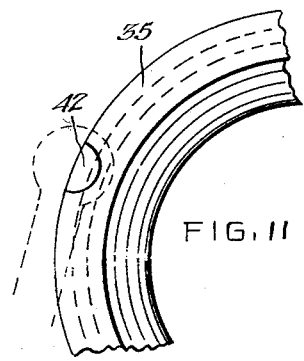
Figs. 11 and 12 are similar side views of a portion of one of the inner piston-carrying rings, showing one of the lugs thereof, respectively with and without the crank arm bushing.
Figure 12:
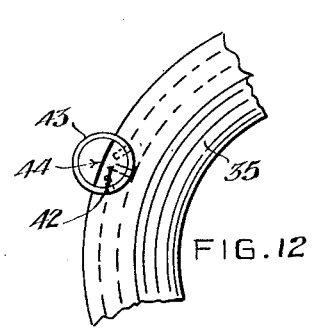
Figure 13:
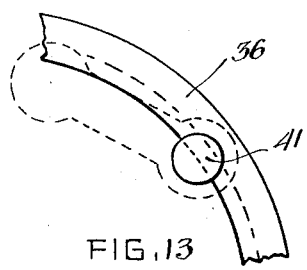
Fig. 13 is a side view of a portion of one of the outer piston-carrying rings.

The outer piston-carrying rings 36 have laterally and outwardly projecting lugs 41 to which the inner ends of certain of the crank arms 34 are connected, these lugs 41 being full round, as seen in Fig. 13. The inner rings 35 also have laterally outstanding lugs 42, these lugs receiving the inner ends of the other crank arms 34 of the two series of the gear casings 21, although these lugs 42 as seen in Figs. 11 and 12 are but half-round in order to permit the outer ring 36 to be slipped into proper position around the inner rings. In connection with the lugs 42 of the inner rings, I therefore utilize bushings 43 at the inner ends of the respective crank arms 34 these bushings carrying internal half-rounds 44, as seen particularly in Fig. 12 and being attached, as shown, to the lugs 42, in order to complete full rotative supports for the inner ends of the said crank arms.

As is common in engines of this type, the pistons 39 and 40 operate in pairs. The foremost piston of each pair advancing through its relatively fast stroke after firing of the charge between the pistons, during which time the power of its movement resulting from the explosion is transmitted through the crank arms 34 to the gears 32 of its crank arms so that the latter, bearing as they do against the internal stationary gear ring 30, will force speedy rotation of the external gear ring 31, the latter of which is, as before stated, carried by the inner rotating wall 24 of the casing. Rotation is thus communicated through the inner wall 24 and its hubs 25 to the driven shaft 22, to the latter of which the hubs 25 are keyed as seen in dotted lines in Fig. 5.

Figure 3:
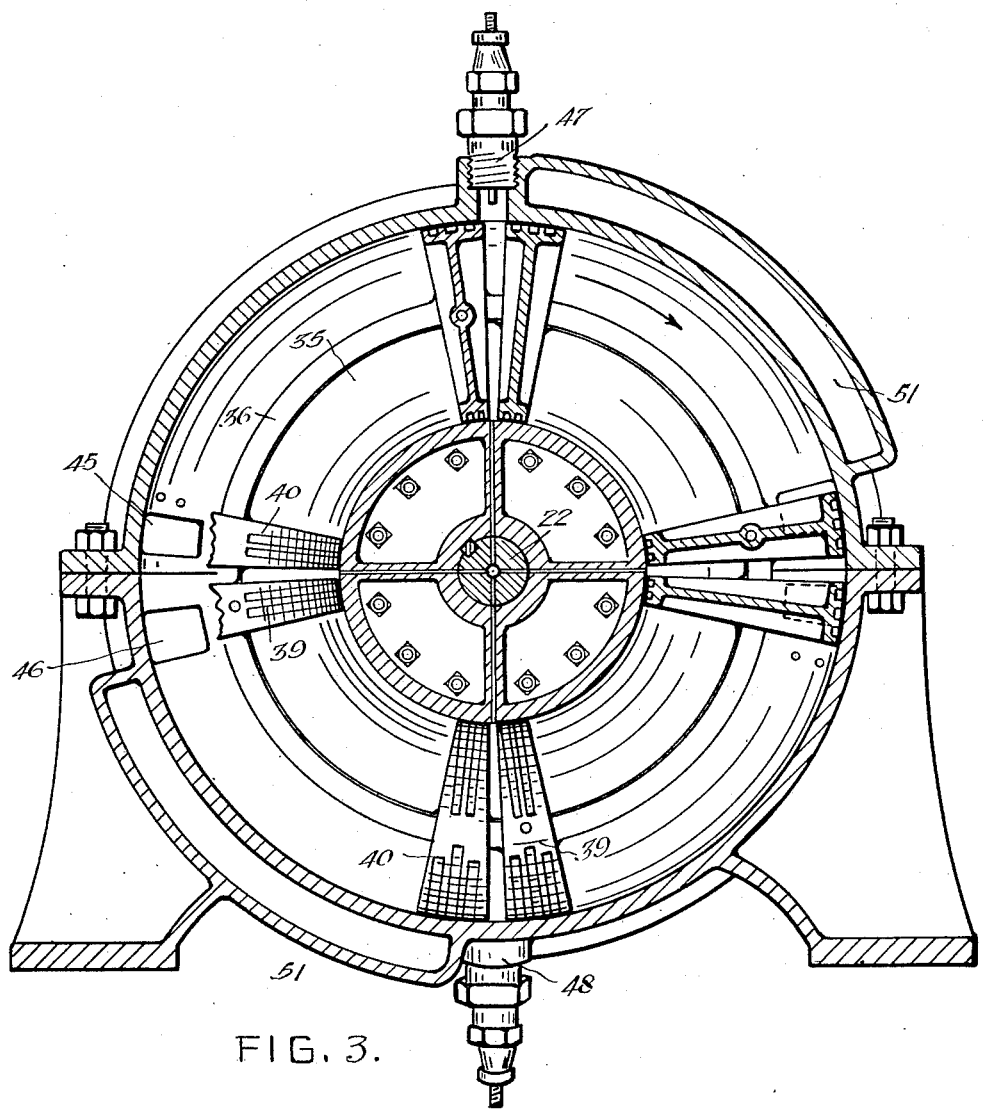
Fig. 3 is a vertical longitudinal section taken substantially on line 3—3 of Fig. 2.

Referring now to Fig. 3, it will be noted that the outer shell or wall has intake and exhaust ports 45 and 46 arranged in pairs in diametrically opposite sides of the complete cylinder and so arranged that the rearmost piston of each pair laps the exhaust port as it finishes one of its fast strokes so as to expose the power and exhaust spaces in the rear of the same to the exhaust port 46. Thus as the rearmost piston of each pair laps the exhaust port in the manner stated, the foremost piston immediately in advance thereof will be starting upon its fast stroke so that it passes the intake port 45, and in this way the next fast stroke of the succeeding piston will compress the charge taken in through the intake port 45, and the two pistons will again come together, or rather adjacent to one another with a charge compressed therebetween at one of the firing stations opposite the spark plugs 47 and 48 disposed at diametrically opposite points with respect to the complete piston cylinder and substantially at right angles to a line between the pairs of intake and exhaust ports.

By reference to Fig. 5, it will be noted that the lowermost spark plug 48 is set at an angle with respect to the lower portion of the piston cylinder so that its opening into the cylinder is positioned above the lowermost point of the latter, in order to obviate filling up of the same with lubricating oil, supplied to the working cylinder in any desired manner so as to be thrown out from the central portion thereof by centrifugal action.

Lubricating oil is furnished to the gears through oil holes 49 in the upper portions of the two gear cases 21, from the lower portions of which drain cocks 50 depend so that the oil may be drained from time to time.

In case it is necessary, the outer wall or shell 23 may be provided with double walled water circulating spaces 51 extending along the power and exhaust portions of the cylinder, in order to prevent overheating at these points and obviate the disadvantages of unequal expansion, the interior portions of the engine being cooled, for instance, by the action of an air current movable parallel to the driven shaft, as previously described in connection with Fig. 4.

Figure 10:
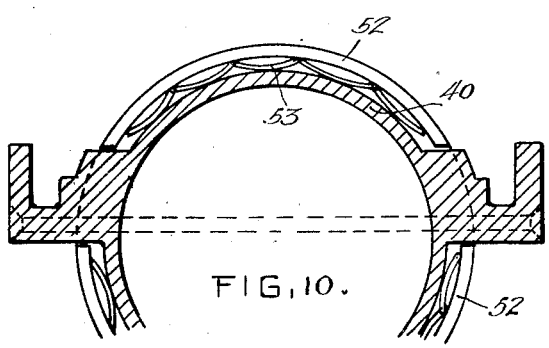
Fig. 10 is an enlarged cross section through one of the pistons of the outer rings.
Figure 14:
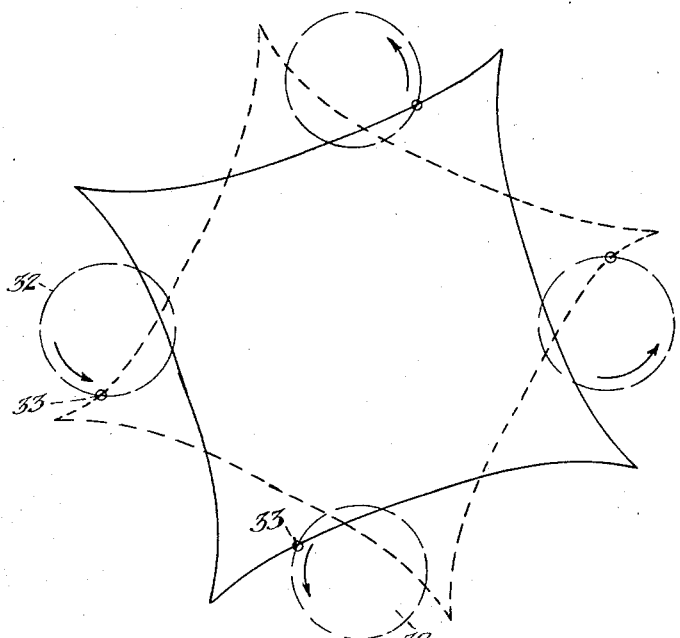
Fig. 14 is a diagram showing the circuit of movement or travel of a point on one of the connecting gears.

It is obvious that by virtue of the piston carrying rings 35 and 36 the pistons 39 and 40 can not be supplied with piston rings extending entirely around the same, and I therefore preferably utilize rings 52 of segmental form, as seen in Fig. 10, particularly disposed in grooves in the peripheral faces of the pistons and held outwardly in yielding relation against the inner surfaces of the cylinder by springs, such, for instance, as seen at 53.

As seen at Figs. 1 and 2, the intake ports 45 may be in communication with the opposite ends of an intake manifold 54 leading from a carbureter or other combustible fuel supply 55, the exhaust ports 46 being similarly in communication with the exhaust manifold 56 in communication with an exhaust pipe 57.

Figure 15:
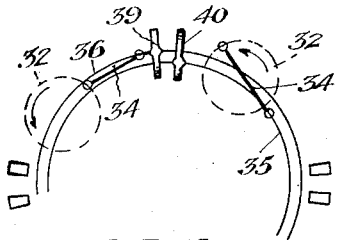
Figs. 15 and 16 are diagrams illustrating two relative positions of opposed pistons during operation, as hereinafter described.
Figure 16:
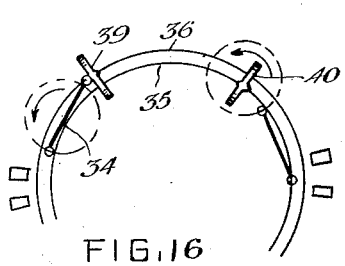

Thus it will be understood that in operation each pair of pistons approach one of the firing stations at the spark plugs 47 and 48, with the foremost piston at the end of its slow movement and the rearmost piston at the end of its fast movement whereby during these movements, just completed, the relatively greater travel of the rearmost piston compresses the charge therebetween. The charge is then fired by a spark delivered at the spark plug and by virtue of the great leverage in movement of the foremost piston of the pair it immediately recedes away from the rearmost piston whose only leverage tends to shift the inner internal teeth gear 31 in the same direction as seen by a comparison of Figs. 15 and 16. As the foremost piston recedes through the power and exhaust spaces, in the clock-like rotative movement of the ports, it uncovers the adjacent exhaust port 46 at the end of its fast movement and thus places the space in front of the rearmost piston in communication with the exhaust at about the time the latter starts upon its next fast stroke, it being obvious that the connections, including the crank arms 34, gears 32, and gear rings 30 and 31 bring about a proper transfer of power to the driven shaft and applies the same to the driven shaft in the nature of speedy movement.

It is also obvious that by virtue of the particular connections including the piston-carrying rings 35 and 36 in rotative connection at the sides of the piston cylinder and closing the latter, a proper seal may be maintained at all times, and one which is capable of correction at any time in view of the capabilities of the parts and construction as to ready assembly and disassembly.

The outer sides of the gear casings 21 are preferably closed by annular plates 58, whose outer peripheral edges are bolted by bolts 59 to the side edges of the outer shell or wall 23, and whose inner edges are beveled to movably engage the similarly beveled edges at 60 of the inner wall or shell 24, as plainly to be seen by reference to Fig. 5.

I claim:

1. In a rotary internal combustion engine, an annular piston cylinder including outer and inner walls, the former of which is stationary and the latter of which is rotatable, a driven shaft extending centrally through the engine and having connection with the inner wall, said walls being laterally extended at opposite sides of the cylinder to form gear casings and having oppositely disposed gear rings rigid therewith and located within the gear casings, gears between and in engagement with said gear rings, pistons within the cylinder having movable piston-carrying rings at the sides of the cylinder, and crank arms connecting the said piston-carrying rings with the said connecting gears, as described.

2. A rotary internal combustion engine comprising an annular piston cylinder, including inner and outer walls spaced apart at the sides of the cylinder and provided with laterally extending portions forming gear casings, opposing gears rigid with the inner and outer walls, piston-carrying rings disposed in the said spaces between the inner and outer walls at the sides of the cylinder and having rotatable engagement with the said walls and with one another, pistons carried by the said rings, gears between and in engagement with the said gears of the inner and outer walls, cranks connecting the piston-carrying rings with the said latter gears, and a driven shaft extending axially through the said cylinder and connected to the inner wall, for the purpose described.

3. A rotary internal combustion engine comprising a driven shaft, a casing therearound having an annular piston cylinder and including inner and outer walls, the latter of which is stationary and the former of which is connected to the said driven shaft, opposing gears carried by the said inner and outer walls at opposite sides of the piston cylinder, gears between and in engagement with the first-named gears, pistons movable in the piston cylinder, rings rotatable at the sides of the piston cylinder and supporting said pistons, and crank connections between the said piston-carrying rings and the last-mentioned gears, as described.

4. A rotary internal combustion engine comprising a driven shaft, a casing therearound having an annular piston cylinder axial with the shaft and including inner and outer walls, the former of which is connected with the driven shaft and the latter of which is stationary, said inner and outer walls having laterally extending portions beyond the piston cylinder forming gear casings and provided with rigid externally and internally toothed gears, gears disposed between and in engagement with the said gears of the inner and outer walls, pistons movable in the cylinder, piston-carrying rings rotatable at the sides of the piston cylinder, and crank connections between the said piston-carrying rings and the last-named gears, for the purpose described.

5. A rotary internal combustion engine comprising a driven shaft, a casing therearound having an annular piston cylinder axial with the shaft and including inner and outer walls, the former of which is connected with the driven shaft and the latter of which is stationary, said inner and outer walls having laterally extending portions beyond the piston cylinder forming gear casings and provided with rigid externally and internally toothed gears, gears disposed between and in engagement with the said gears of the inner and outer walls, pistons movable in the cylinder, piston-carrying rings rotatable at the sides of the piston cylinder, and crank connections between the said piston-carrying rings and the last named gears, the connection between the driven shaft and the inner wall of the casing including arms in the nature of fan blades to induce a current of air through the engine casing to and around the driven shaft, as described.

6. A rotary internal combustion engine comprising a driven shaft, a casing therearound having an annular piston cylinder axial with the shaft and including inner and outer walls, the former of which is connected with the driven shaft and the latter of which is stationary, said inner and outer walls having laterally extending portions beyond the piston cylinder forming gear casings and provided with rigid externally and internally toothed gears, gears disposed between and in engagement with the said gears of the inner and outer walls, pistons movable in the cylinder, piston-carrying rings rotatable at the sides of the piston cylinder, and crank connections between the said piston-carrying rings and the last named gears, said piston-carrying rings being mounted and independently rotatable between portions of the inner and outer walls at relatively opposite sides of the piston cylinder and cutting off communication between the cylinder and the gear casings.

7. A rotary internal combustion engine including a casing having an outer stationary wall and an inner movable wall forming an annular piston cylinder therebetween, an axial driven shaft to which the inner wall is connected, pistons movably interfitting the piston cylinder, said inner and outer walls having spaced apart portions at opposite sides of the cylinder, rings carrying the said pistons and arranged in and closing the said spaces between the wall at the cylinder's sides, and differentially movable connections between the said piston-carrying rings and the movable inner wall of the casing, as described.

8. A rotary internal combustion engine including a casing having an outer stationary wall and an inner movable wall forming an annular piston cylinder therebetween, an axial driven shaft to which the inner wall is connected, pistons movably interfitting the piston cylinder, said inner and outer walls having spaced apart portions at opposite sides of the cylinder, rings carrying the said pistons and arranged in and closing the said spaces between the wall at the cylinder's sides, and differentially movable connections between the said piston-carrying rings and the movable inner wall of the casing, said piston-carrying rings having annular faces in contact with one another provided with leak-proof rings and having antifriction means facilitating their movable engagement with the adjacent portions of the inner and outer walls.

9. A rotary internal combustion engine comprising a casing having inner and outer walls forming an annular piston cylinder, an axial driven shaft to which the inner wall is connected, pistons movable within the piston cylinder, piston-carrying rings in movable engagement with one another and with the adjacent portions of the inner and outer walls at opposite sides of the piston cylinder, said rings having laterally outstanding lugs and said inner and outer walls having laterally outstanding external and internal gear portions opposing one another, gears between and in engagement with the said gear portions of the inner and outer walls and having lateral projections in the lugs, and crank arms, each of which is engaged with one of the gear lugs at its outer end and connected at its inner end to one of the lugs of the piston-supporting lugs.

10. A rotary internal combustion engine including a casing having an outer stationary wall and an inner movable wall forming an annular piston cylinder therebetween, an axial driven shaft to which the inner wall is connected, pistons movably interfitting the piston cylinder, said inner and outer walls having spaced apart portions at opposite sides of the cylinder, rings carrying the said pistons and arranged in and closing the said spaces between the wall at the cylinder's sides, and differentially movable connections between the said piston-carrying rings and the movable inner wall of the casing, each of said pistons having segmental piston rings, and means for yieldingly supporting the said piston rings at opposite sides of the said piston-carrying rings.

In testimony whereof I affix my signature.

STUART L. NOBLE.